US008099724B2

(12) United States Patent
Plummer

(10) Patent No.: US 8,099,724 B2
(45) Date of Patent: Jan. 17, 2012

(54) FAST PATCH-BASED METHOD CALLS

(75) Inventor: Christopher J. Plummer, San Martin, CA (US)

(73) Assignee: Oracle America, Inc., Redwood City, CA (US)

( * ) Notice: Subject to any disclaimer, the term of this patent is extended or adjusted under 35 U.S.C. 154(b) by 1492 days.

(21) Appl. No.: 11/365,146

(22) Filed: Feb. 28, 2006

(65) Prior Publication Data

US 2007/0234311 A1 Oct. 4, 2007

(51) Int. Cl.
*G06F 9/45* (2006.01)
(52) U.S. Cl. .......................... 717/151; 717/148
(58) Field of Classification Search .......................... None
See application file for complete search history.

(56) References Cited

U.S. PATENT DOCUMENTS

| | | | | |
|---|---|---|---|---|
| 4,970,639 A * | 11/1990 | Diefendorf et al. | ............ | 717/174 |
| 6,021,469 A * | 2/2000 | Tremblay et al. | ............. | 711/125 |
| 6,151,703 A * | 11/2000 | Crelier | ........................ | 717/136 |
| 6,170,083 B1 * | 1/2001 | Adl-Tabatabai | ............... | 717/158 |
| 6,233,678 B1 * | 5/2001 | Bala | ............... | 712/240 |
| 6,233,725 B1 * | 5/2001 | Beadle et al. | ................. | 717/118 |
| 6,295,642 B1 * | 9/2001 | Blandy | ........................ | 717/148 |
| 6,321,323 B1 * | 11/2001 | Nugroho et al. | ................ | 712/34 |
| 6,429,860 B1 * | 8/2002 | Hughes | ........................ | 345/418 |
| 6,779,188 B1 * | 8/2004 | Blandy et al. | ................ | 719/331 |
| 6,915,513 B2 * | 7/2005 | Duesterwald et al. | ........ | 717/168 |
| 6,928,536 B2 * | 8/2005 | Duesterwald et al. | ........ | 712/226 |
| 2002/0112227 A1 * | 8/2002 | Kramskoy et al. | ............ | 717/148 |
| 2003/0046449 A1 * | 3/2003 | Gray-Donald et al. | ........ | 709/330 |
| 2003/0079215 A1 * | 4/2003 | Hundt et al. | ................. | 717/164 |
| 2003/0101431 A1 * | 5/2003 | Duesterwald et al. | ........ | 717/111 |
| 2004/0049667 A1 * | 3/2004 | McCormick et al. | ......... | 712/233 |

OTHER PUBLICATIONS

Manze, Paul, "White Papers: Dynamic Adaptive Compilation (DAC) and Competing Java Acceleration Strategies" Jan. 22, 2002. Insignia Solutions. Relavent pp. 1-5.*
European Patent Office, "Communication, European Search Report", European application No. 07250802.1, dated Mar. 13, 2008, 2 pages.
Claims, European application No. 07250802.1, 10 pages.
European Patent Office, "Communication, European Search Report", European application No. 07250802.1, dated Jun. 18, 2007, 8 pages.
Debbabi, Mourad, et al., "E-Bunny: A Dynamic Compiler for Embedded Java Virtual Machines", XP-002436057, Journal of Object Technology, vol. 4, No. 1, dated Jan.-Feb. 2005, pp. 81-106.

(Continued)

*Primary Examiner* — Tuan Dam
*Assistant Examiner* — Samuel Hayim
(74) *Attorney, Agent, or Firm* — Osha • Liang LLP

(57) ABSTRACT

A patch-based mechanism is disclosed for providing fast invocations of a target method from a compiled calling method. The code for the calling method is stored into a storage. The code for the calling method comprises an instruction for invoking the target method, where the instruction comprises a parameter. In response to a state change from a current state to a new state that is experienced by the target method, the parameter is modified from a first value to a second value, where the second value indicates the correct address for facilitating the execution of the target method in its new state. Thus, the parameter in the instruction for invoking the target method always reflects the correct state of the target method, which provides for a fast invocation of the target method when the instruction is executed.

34 Claims, 8 Drawing Sheets

OTHER PUBLICATIONS

Suganuma, Toshio, et al., "A Dynamic Optimization Framework for a Java Just-In-Time Compiler", XP-002436058, Sigplan Notices ACM USA, vol. 36, No. 11, dated Nov. 2001, pp. 180-194.

Sun Microsystems, Inc., "CDC HotSpot Implementation Dynamic Compiler Architecture Guide", Connected Device Configuration, Version 1.1.1, Foundation Profile, Version 1.1.1, Optimized Implementation, XP-002436056, Sun Microsystems Inc., retrieved from website: <http://java.sun.com/javame/reference/docs/cdc_dynamic_compiler_arch.pdf>, dated Aug. 2005, 41 pages.

Kazuaki Ishizaki, et al., "A Study of Devirtualization Techniques for a Java Just-In-Time Compiler", at "http://www.ida.liu.se/~uweas/SlidesAndAbstracts-00451/ishizaki-slides.pdf", printed Jul. 3, 2006, 29 pgs.

Kazuaki Ishizaki et al., "A Study of Devirtualization Techniques for a Java Just-In-Time Compiler", Conference on Object Oriented Programming Systems Languages and Applications, ACM Oct. 2000, pp. 294-310.

Office Action in related Chinese Patent Application No. 200710079946.1 dated Jan. 18, 2011 with English translation (13 pages).

* cited by examiner

FAST PATCH-BASED METHOD CALLS

BACKGROUND

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

A typical Java Virtual Machine (JVM) includes an interpreter for executing Java applications or other Java-based code. When a Java method implemented as bytecodes in an instance of a Java class is invoked, the interpreter accesses the method and executes the bytecodes interpretively. Some JVMs may further provide a dynamic adaptive compiler for speeding the execution of Java methods. When such JVM detects that a particular method is frequently executed, the JVM uses the dynamic adaptive compiler to compile the method into native code. The JVM stores the native code in a region of memory (e.g. a code cache), and the next time the method is invoked, the JVM executes the native code found in memory instead of using the interpreter to interpretively execute the bytecode of the method. In order to efficiently utilize its allocated memory, such JVM typically removes from memory the native code for compiled methods that are not used frequently anymore. The process of removing the executable code for a compiled method from memory is referred to herein as decompilation.

A typical method may include invocations, or calls, to a number of other methods or even to itself (e.g. recursive calls). A method that invokes another method is referred to herein as a calling method. A method that is being invoked by another method is referred to herein as a target method. In a typical JVM, method invocations from compiled methods are slower than necessary because the correct runtime addresses of the target methods are not known by the calling methods at compile time. For example, suppose that a JVM decides to compile a calling method that includes a call to a target method. At compilation time, the JVM does not know the runtime address of the target method with certainty because either (1) the compilation state of the target method (e.g. compiled or not compiled) may change after the calling method is compiled, or (2) the target method may be a virtual method that may be overridden by another method after the calling method is compiled. Because of this uncertainty, the JVM can determine the correct address of the target method only at runtime when the target method is invoked; thus, after compiling the calling method and storing its executable code in memory, the address of the target method has to be determined every time the calling method actually invokes the target method by performing a lookup in the method block of the target method that is stored in memory. (A method block of a loaded method typically indicates the type of the method and stores other run-time information about the method.)

This approach of invoking the target method may cause a significant slowdown on computer processors that have a pipelined architecture. In such processors, a pipeline is used to look forward and pre-fetch a subsequent instruction while the processor is decoding, executing, or writing the results from a previous instruction. In this way, a pipelined processor may be processing and executing several instructions in parallel—for example, while the results of a first instruction are being written to memory or to a register, the processor is executing a second instruction, decoding a third instruction, and fetching a fourth instruction. In the above approach of invoking a target method, the uncertainty of the address of the target method at the time a calling method is compiled may cause a processor to pre-fetch the wrong instructions during the execution of the calling method, which in turn would cause the processor to flush its pipeline. However, flushing the processor pipeline wastes processor cycles and causes an execution slowdown.

For example, when compiling the code of a calling method that invokes a target method, it is necessary to use indirect referencing because it is not known whether the target method will be compiled at the time the target method is called. In some processor architectures, the following set of instructions may be used in the compiled code of the calling method to invoke the target method through indirect referencing:

the address of the method block of the target method is pre-stored in "a0"
   mov lr, pc
   ldr pc, [a0].

The first of the above instructions ("mov lr, pc") stores the value of the program counter "pc" as the return address at which execution will continue after the target method has finished executing. For example, on ARM processor architectures the program counter "pc" would contain the address of the current instruction plus 8. The second instruction ("ldr pc, [a0]") loads the current address of the target method into the program counter from the first word of the method block of the target method in memory. If at the time of execution the target method is compiled, then the current address of the target method (as stored in the first word of the method block of the target method) is the address of the target method in the code cache; if the target method is not compiled, then the current address of the target method is the address of some helper glue code that causes the execution to be redirected to the interpreter. The above set of instructions for invoking a target method performs poorly on a processor with pipelines because the processor cannot look ahead and determine the current address of the target method due to the indirect referencing. This may result in a complete processor pipeline flush every time the target method is invoked, and the number of processor cycles wasted may be equal to the depth of the pipeline.

In order to reduce the chances of processor pipeline flushes, past approaches for target method invocations have relied on making direct method calls to target methods that have already been compiled. However, a problem arises when a compiled target method changes state from compiled to not compiled, because after the target method is decompiled, a direct call in a calling method that invokes this target method does not point to the correct address anymore. In order to solve this problem, past approaches have typically relied on forced decompilation of compiled calling methods. Forced decompilation provides that whenever the state of a target method changes (for example, whenever a target method is overridden or decompiled), all compiled methods that include instructions for directly invoking that target method are decompiled.

Forced decompilation, however, has some significant disadvantages. One disadvantage is that forced decompilation is difficult to implement, especially for methods that are currently in execution. Another disadvantage of forced decompilation is that it is very costly in terms of the memory and processor cycles being used. When a method is decompiled, every other compiled method that invokes this method necessarily must be decompiled. Thus, a state change of a single target method may cause a cascade of decompilations of a significant number of compiled methods. Further, a decompiled method that is frequently invoked will have to eventually be recompiled, which causes the additional use of resources such as memory and processor cycles.

Based on the foregoing, there is a clear need for a technique that does not cause processor pipeline flushes and that avoids the disadvantages of forced decompilation described above.

SUMMARY

To enable faster invocation of methods, one embodiment of the present invention provides techniques for modifying the parameters of instructions in the executable code of compiled calling methods that invoke target methods. The parameter of an instruction that invokes a target method is maintained to reflect the current state of the target method at any given time. The parameter can be any data associated with the instruction, such as, for example, an opcode associated with the instruction, an operand associated with the instruction, and a combination of an opcode and one or more operands. In response to a state change of the target method, the parameters of the instructions in the compiled calling methods are modified to reflect the current state of the target method. Thus, the techniques described herein are faster than prior approaches because the calling methods need not be decompiled and an additional memory lookup in the method block of the target method is not performed.

According to the techniques described herein, a compiled calling method includes an instruction for invoking a target method. Based on whether the target method is a virtual method, or is a non-virtual or static method, there are six possible states for a target method:
 (1) non-virtual/static: compiled
 (2) non-virtual/static: not compiled
 (3) virtual: overridden and compiled
 (4) virtual: overridden and not compiled
 (5) virtual: not overridden and compiled
 (6) virtual: not overridden and not compiled A parameter associated with the instruction reflects at all times the correct address for facilitating the execution of the target method in its current state. If the target method is in states (1) or (5), then the parameter indicates the address in the code cache at which the execution of the target method begins. If the target method is in state (2), then the parameter references a set of code that causes the uncompiled version of the target method to be executed by an interpreter. If the target method is in states (3), (4), or (6), then the parameter references a set of code for invoking virtual methods.

In one embodiment, the techniques for fast patch-based method invocation described herein provide for patching calls to both non-virtual and static target methods from the executable code of a calling method. In this embodiment, a direct branch-and-link instruction comprising a parameter is compiled in the executable code of the calling method to invoke the target method. If the target method is currently compiled and stored in a code cache, then the branch-and-link instruction parameter indicates the address in the code cache at which the execution of the target method begins. In response to the target method being decompiled and removed from the code cache, the value of the branch-and-link instruction parameter is modified to reference a set of code that causes the uncompiled version of the target method to be executed by an interpreter.

In one embodiment, the techniques for fast patch-based method invocation described herein also provide for patching calls to virtual target methods from the executable code of a calling method. In this embodiment, a direct branch-and-link instruction is used in the executable code of the calling method to invoke a virtual target method. According to the techniques described herein, a direct branch-and-link instruction that invokes a virtual target method may be patched when the target method experiences changes in at least one or more of its compilation state (e.g. compiled or uncompiled) or its override state (e.g. overridden or not overridden). The direct branch-and-link instruction may be patched by modifying a parameter of the instruction, which parameter is set and modified in a manner that reflects the current state of the virtual target method. If the target method is currently overridden by at least one other method, then the value of the parameter is set to reference a set of code that is capable of invoking virtual methods. The set of code for invoking virtual methods, when executed, determines the identity of the target method (e.g. the original target method or an override method) that is to be executed and facilitates the execution of the identified method. For example, if the identified target method is decompiled when the direct branch-and-link instruction is executed, then the set of code for invoking virtual methods, when executed, would cause the target method to be executed by an interpreter. If the identified target method is compiled and stored in the code cache, then the set of code for invoking virtual methods, when executed, would cause execution to be transferred to the beginning of the executable code of the target method in the code cache. If the virtual target method is currently not overridden by any other method and is currently compiled and stored in a code cache, then the value of the parameter indicates the beginning of the executable code of the target method in the code cache. In response to the virtual target method experiencing a state change in any of its compilation state and/or its override state, the direct branch-and-link instruction may be patched by modifying the value of its parameter to reflect the current state of the target method as described above.

DETAILED DESCRIPTION OF EMBODIMENT(S)

Overview

Figure 1:
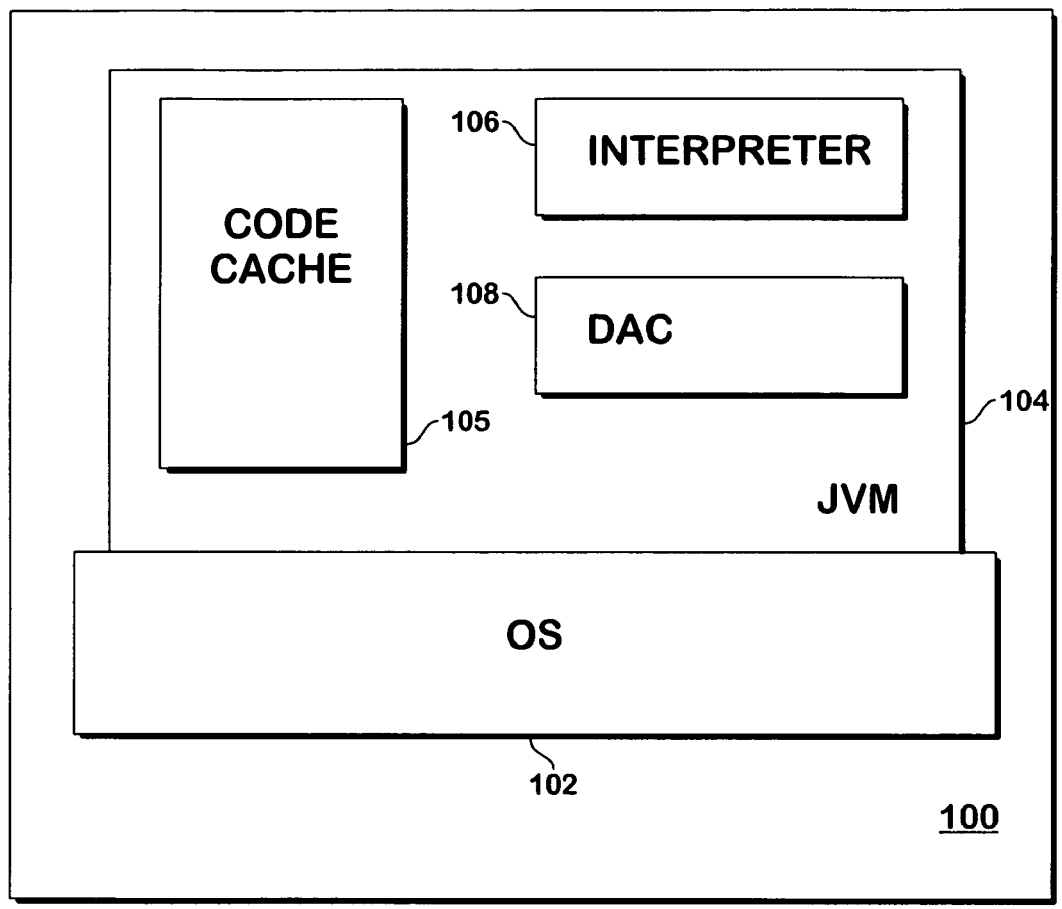
FIG. 1 is a functional block diagram of a system in which one embodiment of the present invention may be implemented.

The techniques for fast patch-based method invocations described herein make use of direct method calls from compiled calling methods instead of indirect referencing. Different processor architectures may provide different instructions or types of instructions that may be used to facilitate direct calls including, but not limited to, branch-and-link instructions, jump instructions, and jump-and-link instructions. Thus, the instructions described hereinafter for facilitating direct method calls from compiled calling methods are to be regarded in an illustrative rather than a restrictive sense.

In some embodiments, a direct branch-and-link instruction is used in the compiled code of a calling method to invoke a target method. A direct branch-and-link instruction as used herein generally refers to an instruction which, when executed by a processor, directly branches execution based on a parameter specified by the instruction. Depending on the particular processor architecture, the parameter specified in the direct branch-and-link instruction may be any reference such as, for example, a label, an instruction pointer, a register, and an address on the program stack. In some embodiments, a parameter associated with such instruction may be an opcode associated with instruction, an operand associated with the instruction, or a combination of an opcode and one or more operands. According to the techniques described herein, the parameter specified in the direct branch-and-link instruction is maintained to indicate the correct address for facilitating the execution of a target method. For example, if the target method is compiled, then the parameter would indicate the starting address of the target method in the code cache; if the target method is not compiled, then the parameter would indicate the address of a set of code that causes an uncompiled version of the target method to be executed interpretively; if the target method is overridden by another method, then the parameter would indicate the address of a set of code that determines which method is to be invoked after the direct branch-and-link instruction is executed. When a target method experiences a state change (such as, for example, when the target method is decompiled or when the state of the target method changes from not being overridden by any other method to being overridden by another method), the direct branch-and-link instruction in the compiled code of the calling method is patched by modifying the parameter to indicate the correct address for facilitating the execution of the target method in its current state. In this way, the calling method is not decompiled when the target method changes states. At the same time, the direct branch-and-link instruction that actually facilitates the execution of the target method indicates the correct subsequent instructions, which allows a processor to pre-fetch these subsequent instructions in its pipeline long before the branch-and-link instruction is executed. Thus, the techniques for fast patch-based method invocation described herein are faster than prior approaches because the calling method need not be decompiled, and an additional memory lookup in the method block of the target method is not performed.

FIG. 1 is a functional block diagram of a system in which one embodiment of the techniques for fast patch-based method invocation described herein may be implemented. For illustration purposes, an embodiment is described herein with reference to a JVM. It should be noted, however, that the techniques for fast patch-based method invocation described herein are not limited to being implemented only in a JVM. Rather, the concepts and techniques taught herein may be applied to any process or virtual machine that is capable of dynamically compiling and interpretively executing instances of object-oriented classes.

Referring to FIG. 1, system 100 comprises a JVM 104 that executes on top of operating system 102. Operating system 102 may be any type of operating system including, but not limited to, a Unix operating system (such as, for example, Solaris OS developed by Sun Microsystems, Inc.), a Linux operating system (such as, for example, Debian), and Windows operating system (such as, for example, Windows XP developed by Microsoft Corporation). Operating system 102 provides the low level functionalities relied upon by the other components in system 100.

JVM 104 is a process that comprises interpreter 106, dynamic adaptive compiler (DAC) 108, and code cache 105. Although FIG. 1 shows these components 105, 106, and 108 as being part of the JVM 104, it should be noted that, if so desired, these components may be implemented separately from the JVM 104. Interpreter 106 interpretively executes Java applications or other Java-based code that is supported for execution by JVM 104. DAC 108 is used by JVM 104 to compile and store in code cache 105 methods that are frequently executed by the JVM. Code cache 105 is a region in memory or other storage for storing executable code. In different embodiments, system 100 may execute multiple JVM processes on top of operating system 102 with each JVM comprising its own components; however, for illustration purposes only one such JVM and its components are depicted in FIG. 1. Interpreter 106 and dynamic compiler 108 may execute within JVM 104 as various execution entities, such as, for example, processes or threads. Code cache 105 may be any type of memory or other type of fast storage that can be utilized by JVM 104 for storing executable code. Thus, JVM 104 and its components depicted in FIG. 1 are to be regarded in an illustrative rather than a restrictive sense.

According to one embodiment, JVM 104 implements the techniques for fast patch-based method invocation described herein. In this embodiment, JVM 104 uses DAC 108 to compile a calling method into executable code and to store the executable code in code cache 105. JVM 104 also includes one or more sets of code or other logic for changing the state of a target method, which may be invoked by the calling method, from a current state to a different new state. In response to a state change that is experienced by the target method, a set of code or other logic in JVM 104 locates the instruction that invokes the target method from the executable code of the calling method and patches a parameter specified by that instruction to indicate the current address for facilitating the execution of the target method.

Invoking Non-Virtual and Static Methods

The techniques for fast patch-based method invocation described herein provide for patching calls to both non-virtual and static target methods from the executable code of a calling method. The techniques described herein are applicable in the same manner to both non-virtual and static target methods because both non-virtual and static target methods can be determined at the time a calling method is compiled.

In one embodiment, a direct branch-and-link instruction is used in the executable code of the calling method to invoke the target method. The following is an example of such instruction for invoking a target method that is compiled and stored in a code cache:

bl <target_method_pc>.

In the above instruction, the instruction parameter "<target_method_pc>" is a value that indicates the address in the code cache at which the execution of the target method begins. In response to the target method being decompiled and removed from the code cache, the above instruction is patched as follows:

bl <invokeInterpreter>.

Figure 2:
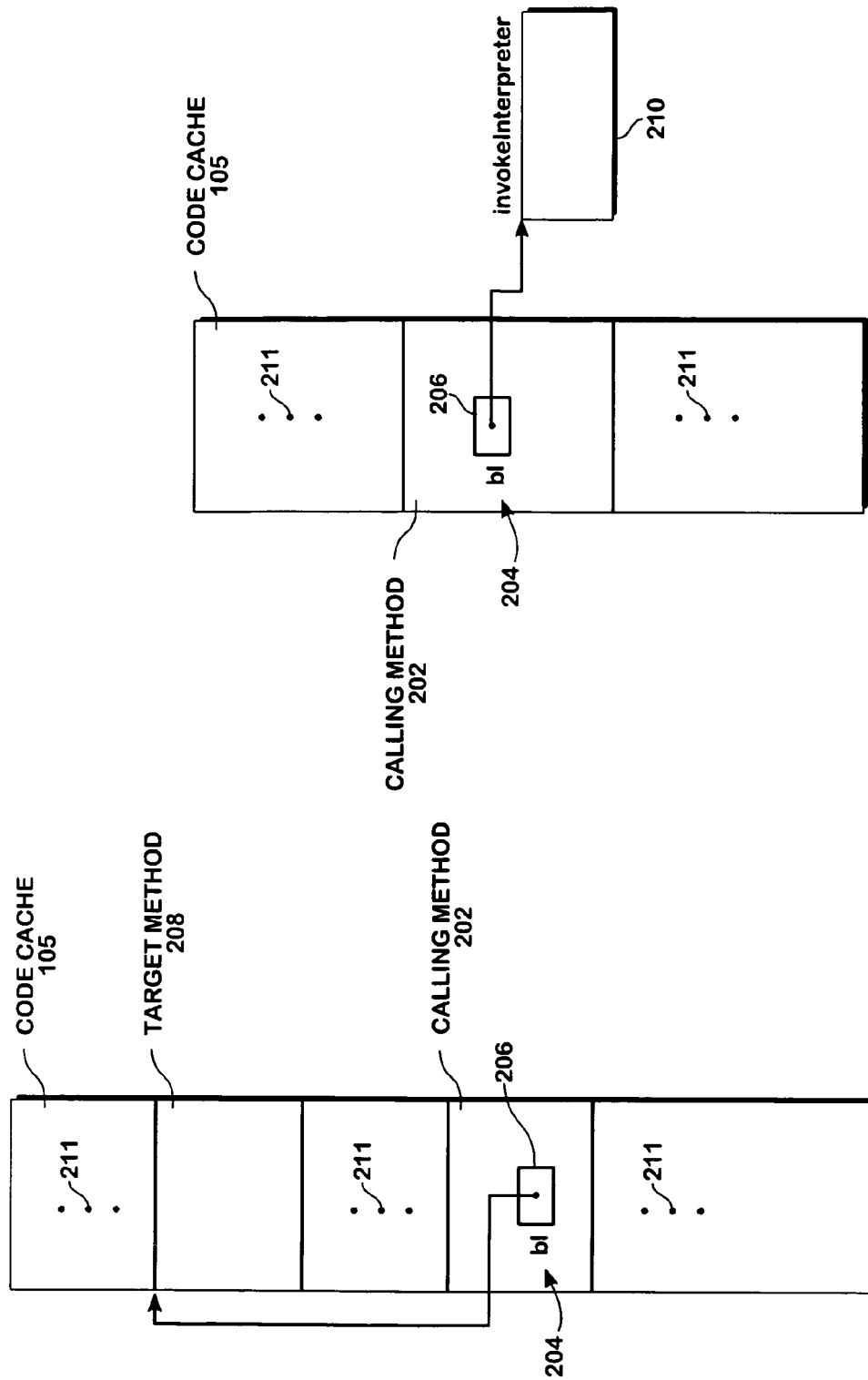
FIG. 2A is a block diagram illustrating a code cache according to an embodiment in which a target method has experienced a change to a compiled state.
FIG. 2B is a block diagram illustrating a code cache according to an embodiment in which a target method has experienced a change to a uncompiled state.

The instruction parameter "<invokeInterpreter>" has a value that references a set of code that causes the uncompiled version of the target method to be executed by the interpreter. In an illustration of this embodiment, FIG. 2A is a block diagram that depicts a code cache in which a target method has experienced a change to a compiled state, and FIG. 2B is a block diagram that depicts a code cache in which the target method has experienced a change to a not compiled state. (A not compiled state is also referred to herein as an uncompiled state.)

Referring to FIG. 2A, code cache 105 is depicted. The executable code of calling method 202 and target method 208 is stored in code cache 105. As indicated by ellipsis 211, one or more other compiled methods or other executable code may also be stored in code cache 105. Calling method 202 comprises direct branch-and-link instruction 204 for invoking target method 208. Instruction 204 comprises a parameter 206 that references the beginning of the executable code of target method 208 in code cache 105.

After calling method 202 has been compiled, the value of parameter 206 may be set to reference the beginning of the executable code of target method 208 in response to a state change of the target method in which the target method has just been compiled and stored in code cache 105. The value of parameter 206 may be also be set to reference the beginning of the executable code of target method 208 if target method 208 is already compiled and stored in code cache 105 at the time calling method 202 is being compiled.

Referring now to FIG. 2B, code cache 105 stores the executable code of calling method 202, as well as other executable code as indicated by ellipsis 211. Target method 208 is in a not compiled state and is not stored in code cache 105. Instruction parameter 206 of direct branch-and-link instruction 204 stores a value that references a set of code 210 which, when executed, transitions execution to the interpreter which then executes the uncompiled target method. (The invokeInterpreter code 210 is a helper glue code that may or may not reside in code cache 105 depending on the particular implementation of the underlying JVM; for illustration purposes only, in FIG. 2B the invokeInterperter code is depicted outside of code cache 105.)

After calling method 202 has been compiled, the value of parameter 206 may be set to reference the invokeInterpreter code 210 in response to a state change in which the target method has just been decompiled and removed from code cache 105. The value of parameter 206 may be also be set to reference the invokeInterpreter code 210 if target method 208 is in a not compiled state at the time calling method 202 is being compiled.

In general, at the time the calling method is compiled a determination is made as to the state of the target method (e.g. compiled or not compiled). If the target method is not compiled and not stored in the code cache, then the instruction in the executable code of the calling method (e.g. direct branch-and-link instruction 206 in FIGS. 2A and 2B) comprises a parameter that references a set of code that causes the uncompiled version of the target method to be executed interpretively (e.g. parameter 206 in FIG. 2B). If later the target method experiences a state change in which it is compiled and stored in the code cache, then the instruction is patched with a parameter value that references the beginning of the executable code of the target method in the code cache (e.g. parameter 206 in FIG. 2A).

If at the time the calling method is being compiled the target method is already compiled and stored in the code cache, then the instruction in the executable code of the calling method (e.g. direct branch-and-link instruction 206 in FIGS. 2A and 2B) comprises a parameter that references the beginning of the executable code of the target method in the code cache (e.g. parameter 206 in FIG. 2A). When later the target method is decompiled and removed from the code cache, the instruction is patched with a parameter value that references a set of code that causes the uncompiled version of the target method to be executed interpretively (e.g. parameter 206 in FIG. 2B).

Figure 4A:
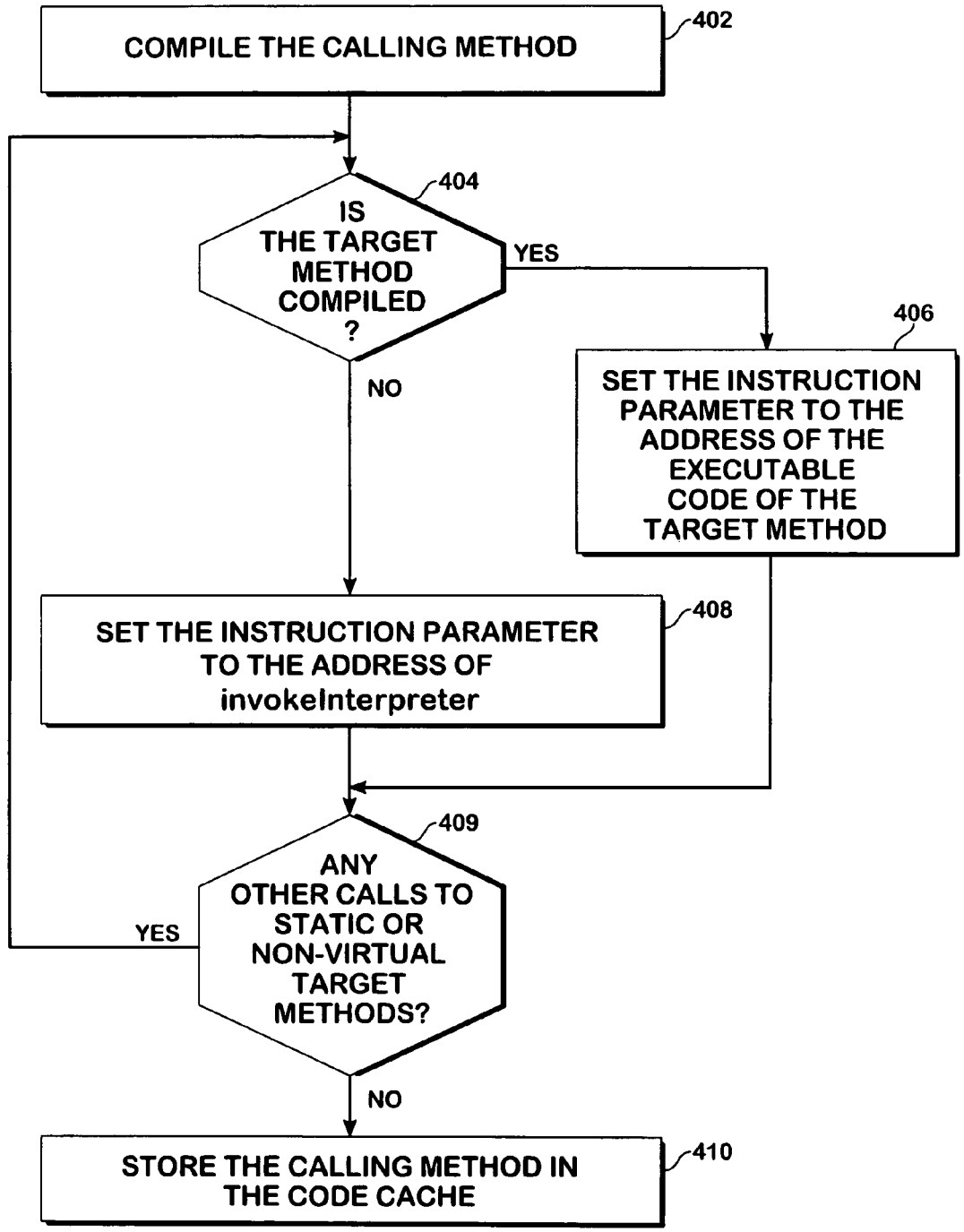
FIG. 4A is a flow diagram illustrating the compilation of a calling method that includes calls to static or non-virtual target methods according to one embodiment.

FIG. 4A is a flow diagram illustrating the compilation of a calling method that includes calls to static or non-virtual target methods according to one embodiment. In step 402, a calling method is compiled. As part of compiling the calling method, in step 404 a determination is made as to whether a target method, which is to be invoked by the calling method, is compiled or not compiled.

If in step 404 it is determined that the target method is compiled, then in step 406 the parameter of the instruction, which invokes the target method from the executable code of the calling method, is set to reference the address of the beginning of the executable code of the target method in the code cache. If in step 404 it is determined that the target method is not compiled, then in step 408 the parameter of the instruction that invokes the target method is set to the address of the invokeInterpreter code which, when executed, transitions execution to the interpreter which executes the target method.

In step 409, a determination is made as to whether the calling method includes any other calls to other static or non-virtual target methods. If the calling method includes calls to other static or non-virtual target methods, then steps 404 to 408 are repeated for all calls in the calling method to these other static or non-virtual target methods. After all calls in the calling method to static or non-virtual target methods are processed in this way, in step 410 the compiled calling method is stored in the code cache.

Figure 4B:
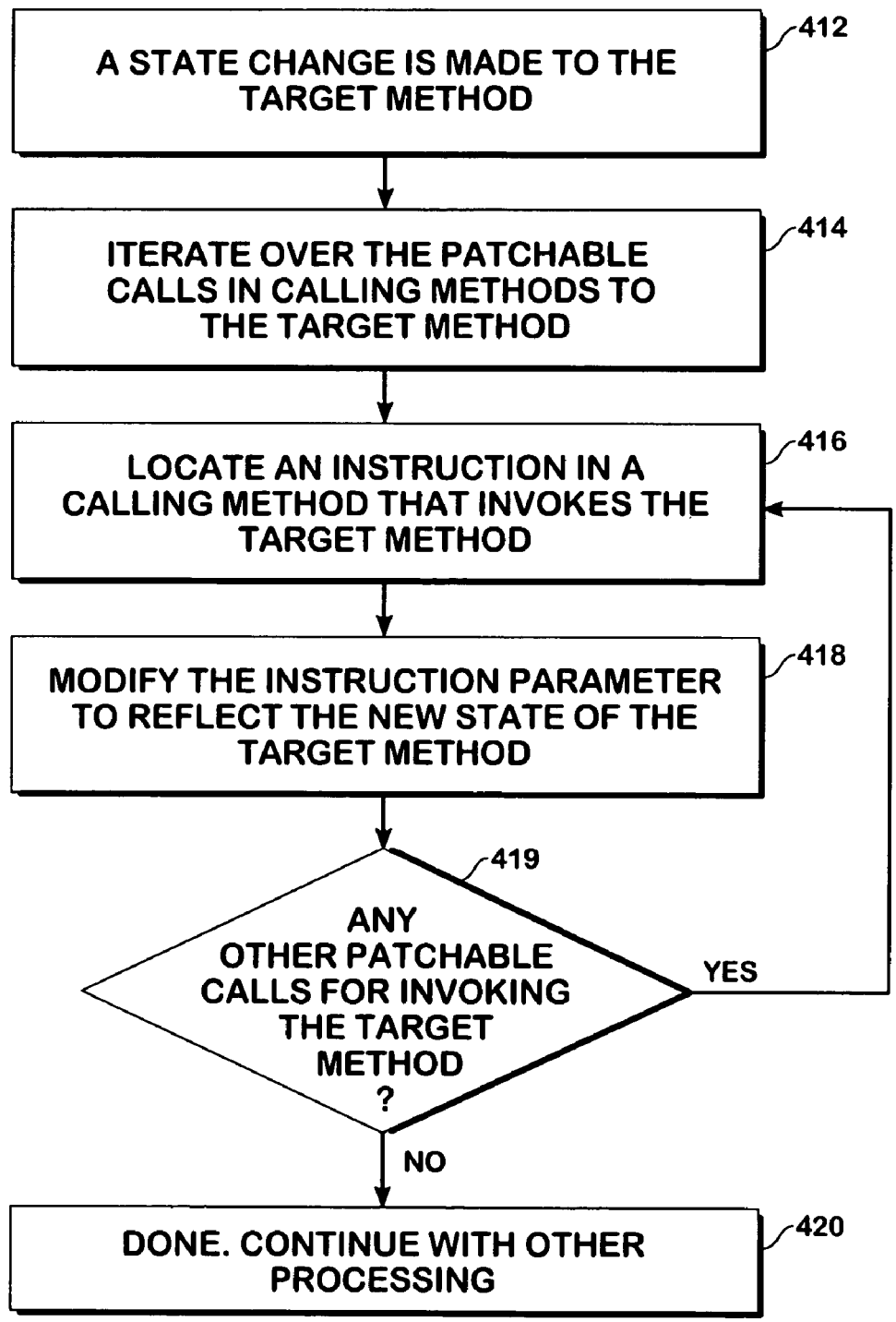
FIG. 4B is a flow diagram illustrating the patching of calling method calls to non-virtual or static target methods according to one embodiment.

FIG. 4B is a flow diagram illustrating the patching of calling method calls to a non-virtual or static target method according to one embodiment. In step 412, a change to the state of the target method is made. For example, in step 412 the target method may experience a state change from a compiled to a not compiled state. Alternatively, in step 412 the target method may experience a state change from an uncompiled to a compiled state.

In response to a state change that is made to the target method, step 414 iterates over the patchable calls to the target method in all calling methods, such as, for example, the calling method that is compiled in step 402 of FIG. 4A. For each patchable call in a calling method, in step 416 of FIG. 4B an instruction that invokes the target method is located in the executable code of that calling method. After the instruction is located, in step 418 a parameter of the instruction is modified to reflect the new state of the target method. If the target method has experienced a change from a compiled to a not compiled state, then the value of the parameter of the instruction is changed to reference the invokeInterpreter code. If the target method has experienced a change from a not compiled to a compiled state, then the value of the parameter is changed to reference the beginning of the executable code of the compiled target method in the code cache.

In step 419 a determination is made whether there are any other patchable calls for invoking the target method in the same or other calling methods. If there are any more patchable calls, then steps 416 and 418 are performed for those patchable calls in the calling method or methods. If in step 419 a determination is made that all patchable calls to target method have been modified, then step 420 continues with other processing.

Tracking Non-Virtual and Static Method Calls

In one embodiment, implementing the techniques for fast patch-based method invocations described herein involves tracking the direct references from a plurality of compiled calling methods to a target method. The direct references from the compiled calling methods to the target method may be the parameters of instructions that are used in the executable code of the compiled calling methods for invoking the target method. The direct references may be recorded in memory or other storage as associations between the target method and the location of particular instructions in the compiled calling methods.

For example, an association may be recorded between the target method and an instruction in a compiled calling method, where the association indicates the location of the instruction in the executable code of the calling method. When the target method experiences a state change (e.g. from compiled to uncompiled), the association is used to identify and locate the instruction in the executable code of the calling method. After the instruction is identified and located in this manner, the instruction may be patched by changing a parameter of the instruction to reflect the new state of the target method.

Tracking the associations between target methods and the instructions in the compiled calling methods that invoke the target methods may be implemented by providing a data structure in the memory or other storage for storing the associations and a look-up mechanism for locating information in the data structure. For example, the data structure may be a hash table, and a hash function may be used to locate in the hash table a particular association between a target method and an instruction in a compiled calling method.

In one embodiment, a patch record may be stored in the data structure with information indicating the association between a target method and an instruction in the executable code of a compiled calling method. In addition, the patch record may also include the patching data that is actually used to modify one or more parameters of the instruction when the target method experiences a state change. Further, a patch record may also include information indicating a particular type of the patch record. For example, one or more bits or bytes of the patch record may indicate the type of the target method state change in response to which the patching data is used to patch the calling method instruction, such as, for example, a compilation state change.

In addition, implementing the techniques for fast patch-based method invocations described herein may also involve removing the associations between a target method and instructions in compiled calling methods when the calling methods are decompiled.

In one embodiment, the removal of such associations may be implemented by traversing the list of all associations that are made between instructions of a particular decompiled calling method and one or more target methods. In this embodiment, the list of all associations to target methods is determined based on the identity of the particular decompiled calling method. Once the list of the associations for the particular decompiled method is determined, the associations on the list are removed from the memory or the other storage where they are recorded.

In another embodiment, the removal of the associations between a target method and the instructions in the compiled calling methods may be implemented by traversing all recorded associations. In this embodiment, for each association a determination is made whether the calling method reflected by the association has been decompiled, and if the calling method has been decompiled then that association is removed from the memory or other storage where it is recorded.

Invoking Virtual Methods

The techniques for fast patch-based method invocation described herein provide for patching calls to virtual target methods from the executable code of a calling method. In object-oriented programming, a virtual method is a method in a base class that is allowed to be overridden by another method that is implemented in a subclass of the base class. Typically, the identity of a virtual target method is not known until the calling method is executed because the instance type of the invoking object (and hence the identity of the override method that should be invoked) can be determined only at runtime.

Similarly to the techniques described above for fast patch-based invocation of non-virtual methods, in one embodiment a direct branch-and-link instruction is used in the executable code of the calling method to invoke a virtual target method. According to the techniques described herein, a direct branch-and-link instruction that invokes a virtual target method may be patched when the target method experiences changes in at least one or more of its compilation state (e.g. compiled or not compiled) and its override state (e.g. overridden or not overridden). The following is an example of such direct branch-and-link instruction for invoking a virtual target method:

bl <P>.

The value of instruction parameter "<P>" is set and modified in a manner that reflects the present state of the virtual target method. If the target method is currently overridden by at least one other method, then the value of parameter "<P>" is set to reference a set of code that is capable of performing a virtual method invocation. A set of code that can perform virtual invocations of virtual methods is referred to hereinafter as "invokeVirtual" code. An invokeVirtual code, when executed, determines the identity of the target method (e.g. the original target method or an override method based on the instance type of the invoking object) that is to be executed and facilitates the execution of the identified method. For example, if the identified target method is not compiled when the above instruction is executed, then the invokeVirtual code, when executed, would cause the target method to be executed by an interpreter. If the identified target method is compiled and stored in the code cache, then the invokeVirtual code, when executed, would cause execution to be transferred to the beginning of the executable code of the target method in the code cache.

When the calling method is initially being compiled, if the virtual target method is (1) compiled and stored in the code cache, and (2) is not overridden by any other method, then parameter "<P>" in the above direct branch-and-link instruction is initially set to a value that references the beginning of the executable code of the target method in the code cache. If at any later point the virtual target method experiences a state change in any of its compilation state and/or its override state, the above direct branch-and-link instruction may be patched by modifying the value of parameter "<P>" to reference the invokeVirtual code. Otherwise, if the target method is overridden by at least one other method when the calling method is initially being compiled, then in some embodiments a set of in-line code is generated for performing virtual invocation of the target method. In these embodiments, if at any later point the virtual target method experiences any state change, no patching is attempted since the set of in-line code executes fast and gives a better performance while the method remains overridden. If the target method is not compiled and is not overridden by any other method when the calling method is initially being compiled, then parameter "<P>" in the above direct branch-and-link instruction is set to the address of the invokeVirtual code. If at any later point the virtual target method experiences a change in its compilation state and becomes compiled, but has not yet been overridden by any other method, then the above direct branch-and-link instruction is patched by modifying the value of parameter "<P>" to reflect the new state of the target method (e.g. the value of parameter "<P>" may be set to the beginning of the executable code of the target method in the code cache since the target method is compiled in its new state).

Figure 3:
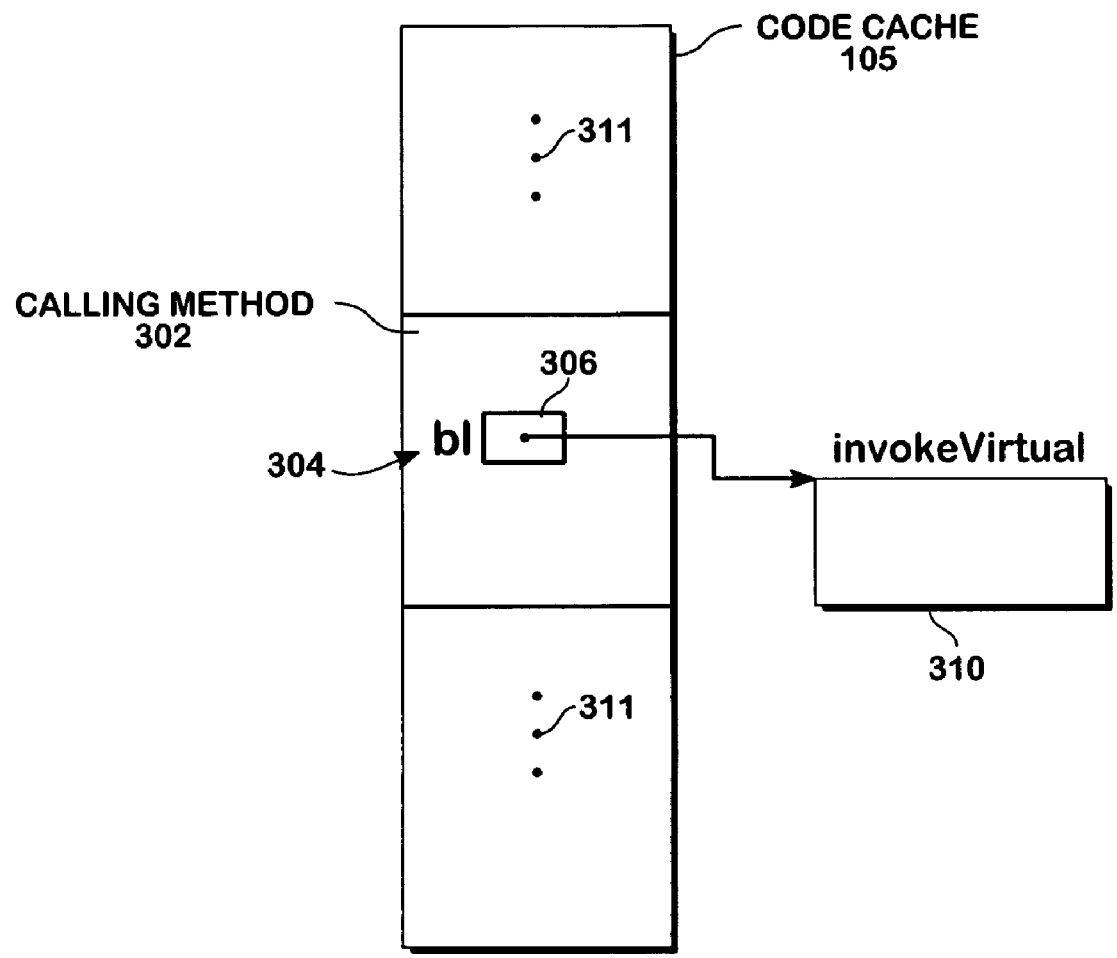
FIG. 3 is a block diagram illustrating a code cache according to an embodiment in which a target method is a virtual method that is not overridden and is not compiled.

FIG. 3 is a block diagram illustrating a code cache according to an embodiment in which a target method is a virtual method that is not overridden and is not compiled. In FIG. 3, the executable code of calling method 302 is stored in code cache 105. As indicated by ellipsis 311, one or more other compiled methods or other executable code may also be stored in code cache 105. Calling method 302 comprises direct branch-and-link instruction 304 for invoking a virtual target method. FIG. 3 reflects a state of the virtual target method in which the target method is not compiled and is not overridden by any other method. Instruction 304 comprises a parameter 306 that references a set of invokeVirtual code 310. The invokeVirtual code 310 is a helper glue code that may or may not reside in code cache 105 depending on the particular implementation of the underlying JVM. (For illustration purposes only, in FIG. 3 the invokeVirtual code is depicted outside of code cache 105.) When executed, invokeVirtual code 310 performs a virtual invocation of the target method. For example, if the target method is not compiled, then execution is transferred to the interpreter which executes the uncompiled version of the method. In some embodiments, in response to the virtual target method experiencing a state change such that in the new state the target method is compiled and stored in code cache 105, the value of parameter 306 may be modified to reference the beginning of the executable code of the target method in the code cache.

In some embodiments, if the virtual target method is overridden by at least one other method when the calling method is initially being compiled, then a set of in-line code is generated and inserted in the executable code of the calling method for performing virtual invocation of the target method. In these embodiments, even if later the virtual target method experiences a state change such that the target method is no longer overridden by any other method, no patching is attempted because once the target method is overridden it usually stays overridden and, while the target method remains overridden, the in-lined code produces a faster invocation of the target method and avoids expending processing resources for tracking of target method state changes.

Figure 4C:
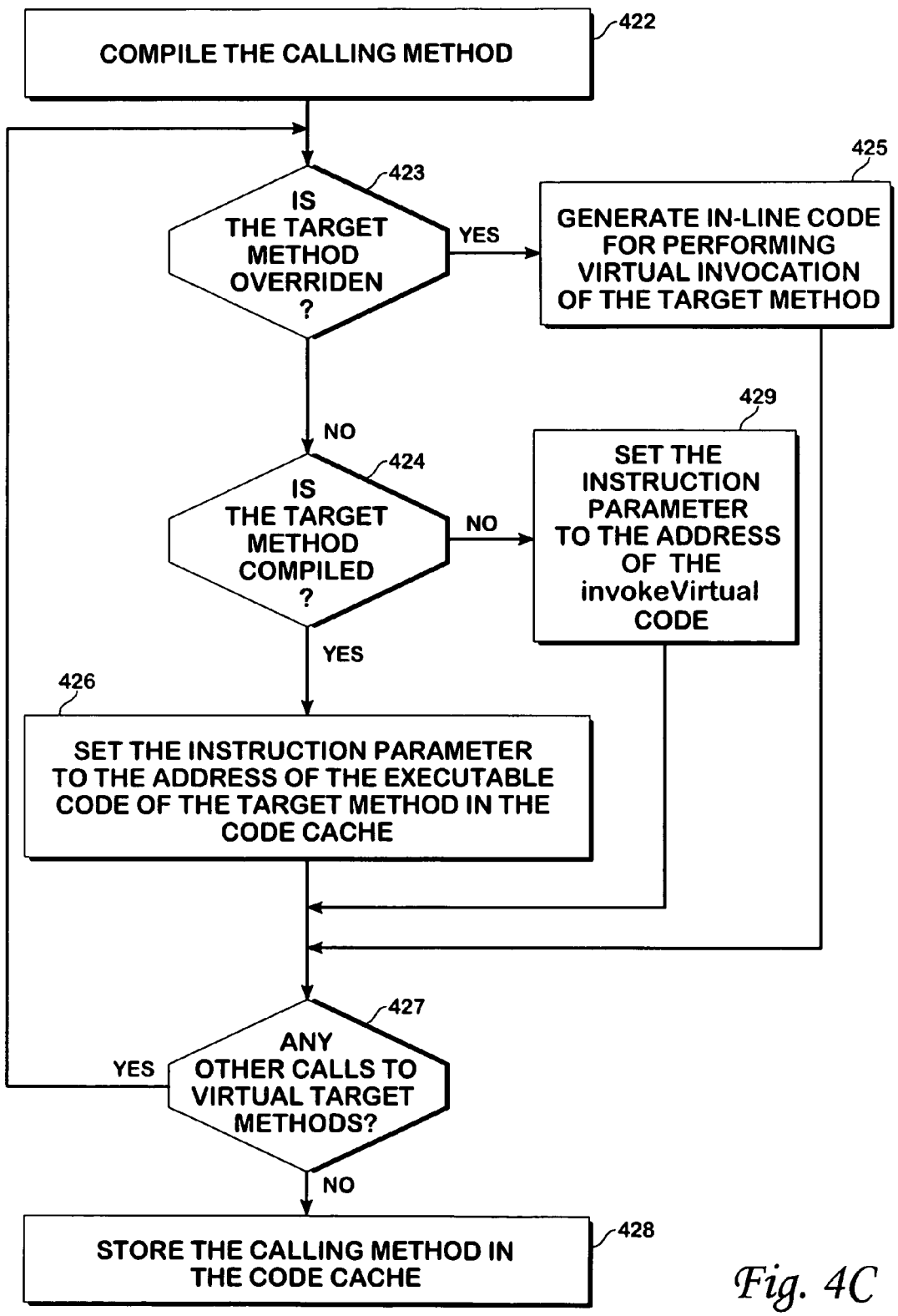
FIG. 4C is a flow diagram illustrating the compilation of a calling method that includes calls to virtual target methods according to one embodiment.

FIG. 4C is a flow diagram illustrating the compilation of a calling method that includes calls to virtual target methods according to one embodiment. In step 422, a calling method is compiled. As part of compiling the calling method, in step 423 a determination is made of whether a virtual target method, which is to be invoked by the calling method, is overridden by one or more other methods.

If in step 423 it is determined that the virtual target method is overridden by at least one other method, then in step 425 a set of in-line code is generated and inserted in the calling method. The set of in-line code, when executed, performs a virtual invocation of the target method. Such virtual invocation may include, for example, first determining whether the original target method or an override method is to be executed and then facilitating the execution the identified method. After the in-line code is generated in step 425, step 427 is performed. If in step 423 it is determined that the virtual target method is not overridden by any other method, then step 424 is performed.

In step 424, a determination is made whether the virtual target method is compiled or not compiled. If in step 424 it is determined that the virtual target method is compiled, then in step 426 the parameter of the instruction, which invokes the target method from the executable code of the calling method, is set to reference the address of the beginning of the executable code of the target method in the code cache. If in step 424 it is determined that the virtual target method is not compiled, then step 429 is performed and the instruction parameter is set to the address of the invokeVirtual code, which in some embodiments may be a set of already generated code for invoking virtual methods.

In step 427, a determination is made as to whether the calling method includes any other calls to other virtual target methods. If the calling method includes calls to other virtual target methods, then steps 423 to 426 are repeated for all calls in the calling method to these other virtual target methods. After all calls in the calling method to virtual target methods are processed in this way, in step 428 the compiled calling method is stored in the code cache.

Figure 4D:
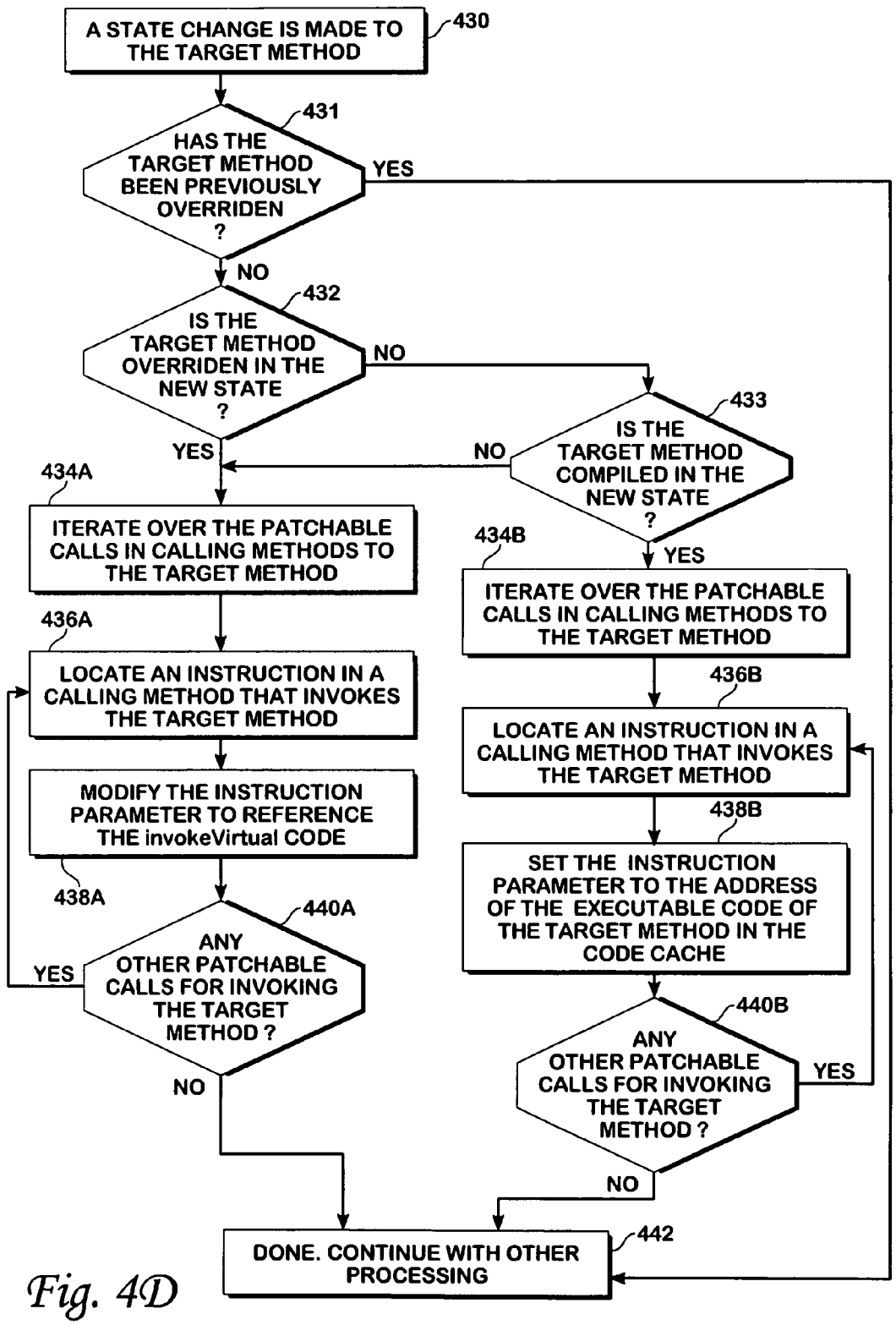
FIG. 4D is a flow diagram illustrating the patching of calling method calls to virtual target methods according to one embodiment.

FIG. 4D is a flow diagram illustrating the patching of calling method calls to virtual target methods according to one embodiment. In step 430, a change to the state of the virtual target method is made. For example, in step 430 the virtual target method may experience a change in its compilation state. Alternatively, or in addition, in step 430 the target method may experience a change in its override state.

In response to a state change that is made to the virtual target method, in step 431 a determination is made as to whether the virtual target method has been previously overridden. For example, in some embodiments an override flag may be stored in the virtual target method; in these embodiments the override flag may be set whenever the virtual target method is overridden for the first time, and thereafter the override flag may be inspected to determine whether the virtual target method has been previously overridden. If in step 431 a determination is made that the virtual target method has been previously overridden, then this would indicate that the instructions in all calling methods that invoke the target method have already been set to reference the invokeVirtual code whenever the target method is invoked. Thus, in this embodiment the instructions in the calling methods that invoke the target method do not need to be patched, and step 442 can performed to continue with other processing.

If in step 431 a determination is made that the virtual target method has not been previously overridden, then in step 432 a determination is made as to whether in the new state the target method is overridden by another method.

If in step 432 a determination is made that in the new state the virtual target method is overridden by at least one other method, then step 434A iterates over the patchable calls to the virtual target method in all calling methods, such as, for example, the calling method that is compiled in step 422 of FIG. 4C. For each patchable call in a calling method, in step 436A of FIG. 4D an instruction that invokes the target method is located in the executable code of that calling method. After the instruction is located, in step 438A a parameter of the instruction is modified to reference the invokeVirtual code which, when executed, facilitates the execution of the virtual target method in its new state. In step 440A a determination is made whether there are any other patchable calls for invoking the virtual target method in the same or other calling methods. If there are any more patchable calls, then steps 436A and 438A are performed for those patchable calls in the calling method or methods. If in step 440A a determination is made that all patchable calls to the virtual target method have been modified, then step 442 continues with other processing.

If in step 432 a determination is made that in the new state the virtual target method is not overridden by any other method, then in step 433 a determination is made whether the target method is compiled in the new state. If in step 433 a determination is made that in the new state the target method is not compiled, then execution proceeds with steps 434A to 440A as described above If in step 433 a determination is made that in the new state the virtual target method is compiled, it means that the target method has not yet been overridden by another method and has just changed its compilation state to being compiled and stored in the code cache. Thus, step 434B is performed to iterate over the patchable calls to the virtual target method in all calling methods, such as, for example, the calling method that is compiled in step 422 of FIG. 4C. For each patchable call in a calling method, in step 436B of FIG. 4D an instruction that invokes the target method is located in the executable code of that calling method. After the instruction is located, in step 438B a parameter of the instruction is set to the address of the executable code of the target method in the code cache. Thereafter, in step 440B a determination is made whether there are any other patchable calls for invoking the virtual target method in the same or other calling methods. If there are any more patchable calls, then steps 436B and 438B are performed for those patchable calls in the calling method or methods. If in step 440B a determination is made that all patchable calls to the virtual target method have been modified, then step 442 continues with other processing.

Tracking Virtual Method Calls

In one embodiment, implementing the techniques for fast patch-based method invocations of virtual method calls described herein involves tracking the direct references from a plurality of compiled calling methods to a virtual target method. In addition, implementing the techniques also involves tracking the overrides of the virtual target method by one or more other methods.

In one embodiment, tracking the direct references to target methods from compiled calling methods may be implemented according to the techniques described above for tracking non-virtual methods call. For example, associations may be recorded between virtual target methods and instructions in compiled calling methods, where the associations indicate the locations of the instructions in the executable code of the calling methods. When a virtual target method experiences a state change (e.g. from not overridden and compiled to overridden or not compiled), a stored association may be used to identify and locate one or more instructions in the executable code of one or more calling methods. After the one or more instructions are identified and located in this manner, the instructions may be patched by changing a parameter of the instructions to reflect the current state of the target method. Similarly to the techniques described above for tracking non-virtual methods calls, any data structure in memory or other fast storage may be used for storing such associations. In addition to tracking the associations between virtual target methods and instructions in compiled calling methods, some embodiments may also provide for removing the associations between a target method and instructions in compiled calling methods when the calling methods are decompiled.

In one embodiment, tracking the overrides of a virtual target method by one or more other methods may be implemented by maintaining a set of override information in the method block of the target method. The override information indicates whether at a particular point in time the virtual target method is overridden. Thus, according to the techniques described herein, the override information may be inspected at any particular point in time to determine whether the target method is or is not overridden by one or more other methods. The override information may initially be set to indicate that the target method is not overridden. Thereafter, whenever a method that overrides the target method is loaded, the override information in the data structure of the target method is modified accordingly to indicate that the target method has been overridden.

In some embodiments, the override information in the target method may be represented as an override flag. Whenever a method that overrides the target method is loaded for execution, the override flag in the target method is set to indicate that the target method is overridden. Thus, in these embodiments in order to determine the override state of a target method, the techniques described herein provide for inspecting the override flag associated with the target method.

In some embodiments, the override information for the target method may be represented as an override count that is initially set to zero. Whenever a method that overrides the target method is loaded for execution, the override count associated with the target method is incremented. Whenever a method that overrides the target method is unloaded and the override count associated with the target method stores a positive value, the override count is decremented. In this manner, at any particular point in time the override count indicates the current override state of the target method. Thus, in these embodiments in order to determine the override state of a target method, the techniques described herein provide for inspecting the override count associated with the target method (e.g. positive override count value indicates that the target method is overridden by at least one other method, and a zero value indicates that the target method is not overridden).

Hardware Overview

Figure 5:
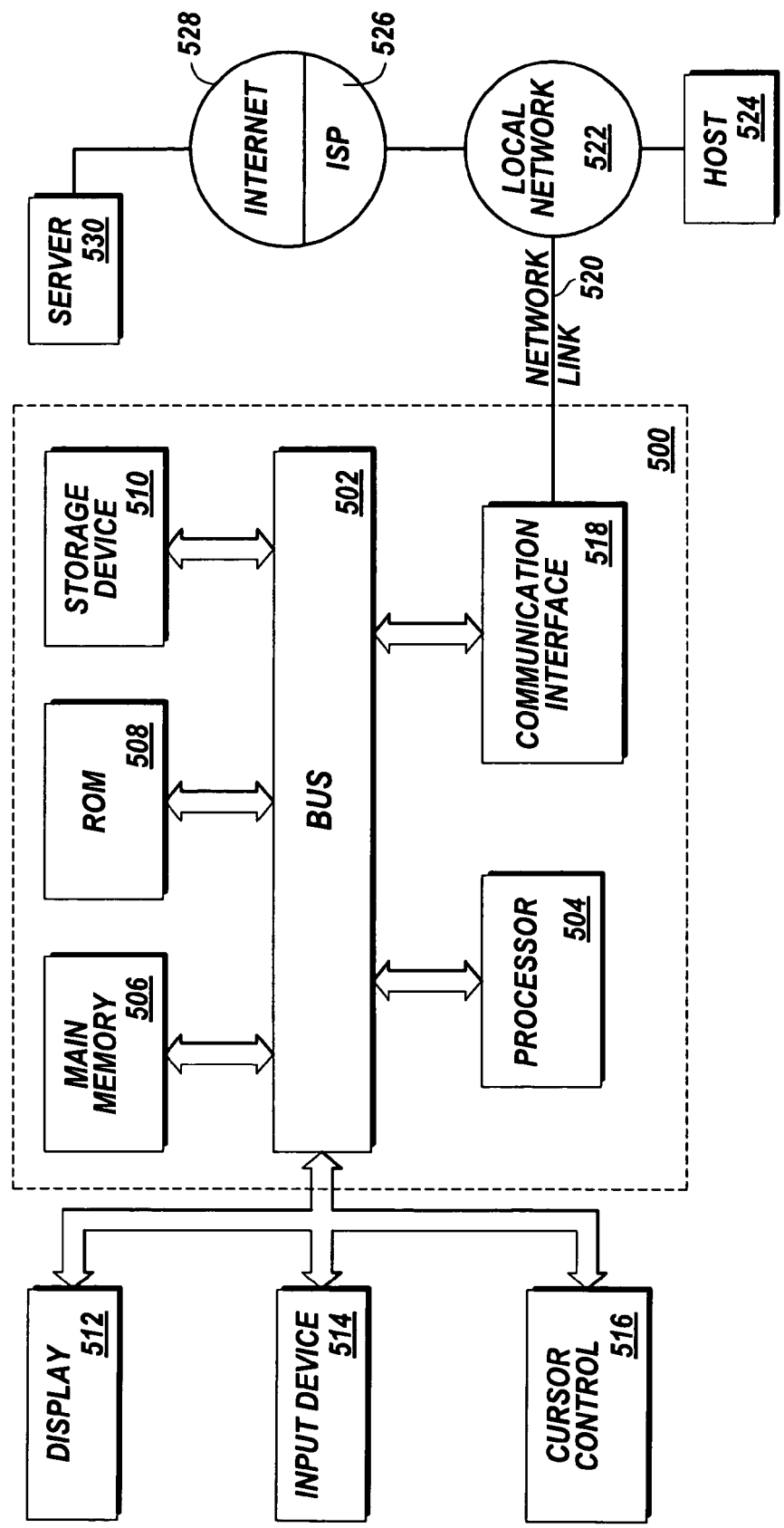
FIG. 5 is a block diagram of a general-purpose computer system in which one embodiment of the present invention may be implemented.

In one embodiment, the operating system 102, JVM 104, interpreter 106 and DAC 108 take the form of sets of instructions that are executed by one or more processors. FIG. 5 is a block diagram of a computer system 500 upon which these sets of instructions may be executed. Computer system 500 includes a bus 502 for facilitating information exchange, and one or more processors 504 coupled with bus 502 for processing information. Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions by processor 504. Computer system 500 may further include a read only memory (ROM) 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512 for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

In computer system 500, bus 502 may be any mechanism and/or medium that enables information, signals, data, etc., to be exchanged between the various components. For example, bus 502 may be a set of conductors that carries electrical signals. Bus 502 may also be a wireless medium (e.g. air) that carries wireless signals between one or more of the components. Bus 502 may further be a network connection that connects one or more of the components. Any mechanism and/or medium that enables information, signals, data, etc., to be exchanged between the various components may be used as bus 502.

Bus 502 may also be a combination of these mechanisms/media. For example, processor 504 may communicate with storage device 510 wirelessly. In such a case, the bus 502, from the standpoint of processor 504 and storage device 510, would be a wireless medium, such as air. Further, processor 504 may communicate with ROM 508 capacitively. Further, processor 504 may communicate with main memory 506 via a network connection. In this case, the bus 502 would be the network connection. Further, processor 504 may communicate with display 512 via a set of conductors. In this instance, the bus 502 would be the set of conductors. Thus, depending upon how the various components communicate with each other, bus 502 may take on different forms. Bus 502, as shown in FIG. 5, functionally represents all of the mechanisms and/or media that enable information, signals, data, etc., to be exchanged between the various components.

The invention is related to the use of computer system 500 for implementing the techniques for fast patch-based method invocations described herein. According to one embodiment of the invention, those techniques are performed by computer system 500 in response to processor 504 executing one or more sequences of one or more instructions contained in main memory 506. Such instructions may be read into main memory 506 from another machine-readable medium, such as storage device 510. Execution of the sequences of instructions contained in main memory 506 causes processor 504 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 500, various machine-readable media are involved, for example, in providing instructions to processor 504 for execution. Such a medium may take many forms, including but not limited to, non-volatile media, volatile media, and transmission media. Non-volatile media includes, for example, optical or magnetic disks, such as storage device 510. Volatile media includes dynamic memory, such as main memory 506. Transmission media includes coaxial cables, copper wire and fiber optics, including the wires that comprise bus 502. Transmission media can also take the form of acoustic or light waves, such as those generated during radio-wave and infra-red data communications.

Common forms of machine-readable media include, for example, a floppy disk, a flexible disk, hard disk, magnetic tape, or any other magnetic medium, a CDROM, DVD, or any other optical storage medium, punchcards, papertape, any other physical medium with patterns of holes, a RAM, a PROM, and EPROM, a FLASHEPROM, any other memory chip or cartridge, or any other physical medium from which a computer can read.

Various forms of machine-readable media may be involved in carrying one or more sequences of one or more instructions to processor 504 for execution. For example, the instructions may initially be carried on a magnetic disk of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are exemplary forms of carrier waves transporting the information.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution. In this manner, computer system 500 may obtain application code in the form of a carrier wave.

At this point, it should be noted that although the invention has been described with reference to a specific embodiment, it should not be construed to be so limited. Various modifications may be made by those of ordinary skill in the art with the benefit of this disclosure without departing from the spirit of the invention. Thus, the invention should not be limited by the specific embodiments used to illustrate it but only by the scope of the issued claims and the equivalents thereof.

What is claimed is:

1. A machine implemented method, comprising:

storing code for a plurality of calling methods into storage, wherein the code for each of the plurality of calling methods comprises an instruction that directly branches execution to a target method based on a parameter specified by the instruction;

prior to a state change of the target method, recording an association between the target method and the instruction of each of the plurality of calling methods that directly branches the execution to the target method;

in response to the state change from a current state to a new state of the target method, using the association to identify the instruction of each of the plurality of calling methods as a specific instruction to be patched in response to the state change, wherein the current state is an uncompiled state and the new state is a compiled state in which the target method has been compiled into executable code;

patching the parameter of each of the plurality of calling methods to indicate an updated address for facilitating direct branching to the target method in the new state; and executing the instruction of at least one of the plurality of calling methods using a value of the parameter.

2. The machine implemented method of claim 1, wherein the value of the parameter comprises a reference to the executable code of the target method.

3. The machine implemented method of claim 1, wherein the current state is a compiled state in which the target method has been compiled into executable code and the new state is an uncompiled state, and wherein the value of the parameter comprises a reference to a set of code that causes an uncompiled version of the target method to be executed interpretively.

4. The machine implemented method of claim 1, wherein modifying the parameter comprises using the association between the target method and the instruction to identify the instruction as a specific instruction that needs to be modified in response to the state change.

5. The machine implemented method of claim 4, further comprising:

determining whether each of the plurality of calling methods has been decompiled and removed from the storage; and in response to a determination that each of the plurality of calling methods has been decompiled, removing the association between the target method and the instruction.

6. The machine implemented method of claim 1, further comprising:

prior to storing the code for the plurality of calling methods into the storage:

compiling each of the plurality of calling methods to derive the code for each of the plurality of calling methods;

determining whether the current state of the target method is a compiled state in which the target method has been compiled into executable code; and in response to a determination that the current state of the target method is the compiled state, setting the parameter of each of the plurality of calling methods to comprise a reference to the executable code of the target method.

7. The machine implemented method of claim 1, further comprising:

prior to storing the code for the plurality of calling methods into the storage:

compiling each of the plurality of calling methods to derive the code for each of the plurality of calling methods;

determining whether the current state of the target method is an uncompiled state; and in response to a determination that the current state of the target method is the uncompiled state, setting the parameter of each of the plurality of calling methods to comprise a reference to a set of code that causes an uncompiled version of the target method to be executed interpretively.

8. The machine implemented method of claim 1, wherein:

the target method is a virtual method;

the current state is a first state in which the target method is not overridden by any override method and the new state is a second state in which the target method is overridden by at least one override method; and the value of the parameter comprises a reference to a set of code for invoking virtual methods.

9. The machine implemented method of claim 8, further comprising:

recording first information when the target method is overridden by the at least one override method; and inspecting the first information to determine whether the target method has experienced the state change.

10. The machine implemented method of claim 9, wherein:

the first information is an override flag that is stored in a method block associated with the target method; and recording the first information comprises setting the override flag when the at least one override method is loaded for execution.

11. The machine implemented method of claim 9, wherein:

the first information is an override count that is stored in a method block associated with the target method; and recording the first information comprises incrementing the override count when each of the at least one override method is loaded for execution.

12. The machine implemented method of claim 1, wherein:

the target method is a virtual method; and the machine implemented method of claim 1 further comprises, prior to storing the code for the plurality of calling methods into the storage, performing the steps of:

compiling each of the plurality of calling methods to derive the code for each of the plurality of calling methods;

determining whether the current state of the target method is a first state in which the target method is not overridden by any override method; and in response to a determination that the current state of the target method is the first state:

if in the first state the target method has been compiled into executable code, then setting the parameter of each of the plurality of calling methods to comprise a first reference to the executable code of the target method; and if in the first state the target method has not been compiled into executable code, then setting the parameter to comprise a second reference to a set of code for invoking virtual methods.

13. The machine implemented method of claim 1, wherein:
the target method is a virtual method; and
the machine implemented method of claim 1 further comprises, prior to storing the code for the plurality of calling methods into the storage, performing the steps of:
compiling each of the plurality of calling methods to derive the code for each of the plurality of calling methods;
determining whether the current state of the target method is a first state in which the target method is overridden by at least one override method; and
in response to a determination that the current state of the target method is the first state, then setting the parameter of each of the plurality of calling methods to comprise a first reference to a set of code that determines which one of the target method and the at least one override method is to be directly branched to when the instruction is executed.

14. The machine implemented method of claim 13, wherein the set of code is in-lined code that is inserted in the code of the plurality of calling methods.

15. The machine implemented method of claim 1, wherein the instruction is a branch-and-link processor instruction.

16. The machine implemented method of claim 1, wherein:
the machine implemented method is implemented in a virtual machine, which comprises a dynamic adaptive compiler for compiling object methods from bytecode into executable code; and
the storage is a region in memory allocated to the virtual machine, wherein the region in memory is configured for storing the object methods compiled by the dynamic adaptive compiler.

17. The machine implemented method of claim 16, wherein the virtual machine is a JAVA virtual machine.

18. A non-transitory machine readable medium, comprising:
instructions for causing one or more processors to store code for a plurality of calling methods into storage, wherein the code for each of the plurality of calling methods comprises an instruction that directly branches execution to a target method based on a parameter specified by the instruction;
instructions for, prior to a state change of the target method, causing one or more processors to record an association between the target method and the instruction of each of the plurality of calling methods that directly branches the execution to the target method;
instructions for causing one or more processors to, in response to the state change from a current state to a new state of the target method, use the association to identify the instruction of each of the plurality of calling methods as a specific instruction to be patched in response to the state change, wherein the current state is an uncompiled state and the new state is a compiled state in which the target method has been compiled into executable code;
instructions for causing one or more processors to patch the parameter of each of the plurality of calling methods to indicate an updated address for facilitating direct branching to the target method in the new state; and
instructions for causing one or more processors to execute the instruction of at least one of the plurality of calling methods using a value of the parameter.

19. The non-transitory machine readable medium of claim 18, and wherein the value of the parameter comprises a reference to the executable code of the target method.

20. The non-transitory machine readable medium of claim 18, wherein the current state is a compiled state in which the target method has been compiled into executable code and the new state is an uncompiled state, and wherein the value of the parameter comprises a reference to a set of code that causes an uncompiled version of the target method to be executed interpretively.

21. The non-transitory machine readable medium of claim 18, wherein the instructions for causing one or more processors to modify the parameter comprise:
instructions for causing one or more processors to use the association between the target method and the instruction to identify the instruction as a specific instruction that needs to be modified in response to the state change.

22. The non-transitory machine readable medium of claim 21, further comprising:
instructions for causing one or more processors to determine whether each of the plurality of calling methods has been decompiled and removed from the storage; and
instructions for causing one or more processors to remove the association between the target method and the instruction in response to a determination that each of the plurality of calling methods has been decompiled.

23. The non-transitory machine readable medium of claim 18, further comprising:
instructions for causing one or more processors to compile each of the plurality of calling methods to derive the code for each of the plurality of calling methods;
instructions for causing one or more processors to determine whether the current state of the target method is a compiled state in which the target method has been compiled into executable code; and
instructions for causing one or more processors to set the parameter of each of the plurality of calling methods to comprise a reference to the executable code of the target method in response to a determination that the current state of the target method is the compiled state;
wherein the instructions for causing one or more processors to compile each of the plurality of calling methods, the instructions for causing one or more processors to determine whether the current state of the target method is a compiled state, and the instructions for causing one or more processors to set the parameter are configured to be executed prior to executing the instructions for causing one or more processors to store the code for the plurality of calling methods into the storage.

24. The non-transitory machine readable medium of claim 18, further comprising:
instructions for causing one or more processors to compile each of the plurality of calling methods to derive the code for each of the plurality of calling methods; instructions for causing one or more processors to determine whether the current state of the target method is an uncompiled state; and
instructions for causing, in response to a determination that the current state of the target method is the uncompiled state, one or more processors to set the parameter of each of the plurality of calling methods to comprise a reference to a set of code that causes an uncompiled version of the target method to be executed interpretively;
wherein the instructions for causing one or more processors to compile each of the plurality of calling methods, the instructions for causing one or more processors to determine whether the current state of the target method is an uncompiled state, and the instructions for causing one or more processors to set the parameter are configured to be executed prior to executing the instructions for causing one or more processors to store the code for the plurality of calling methods into the storage.

25. The non-transitory machine readable medium of claim 18, wherein:
the target method is a virtual method;
the current state is a first state in which the target method is not overridden by any override method and the new state is a second state in which the target method is overridden by at least one override method; and
the value of the parameter comprises a reference to a set of code for invoking virtual methods.

26. The non-transitory machine readable medium of claim 25, further comprising:
instructions for causing one or more processors to record first information when the target method is overridden by the at least one override method; and
instructions for causing one or more processors to inspect the first information to determine whether the target method has experienced the state change.

27. The non-transitory machine readable medium of claim 26, wherein:
the first information is an override flag that is stored in a method block associated with the target method; and
the instructions for causing one or more processors to record the first information comprise instructions for causing the one or more processors to set the override flag when the at least one override method is loaded for execution.

28. The non-transitory machine readable medium of claim 26, wherein:
the first information is an override count that is stored in a method block associated with the target method; and
the instructions for causing one or more processors to record the first information comprise instructions for causing the one or more processors to increment the override count when each of the at least one override method is loaded for execution.

29. The non-transitory machine readable medium of claim 18, wherein:
the target method is a virtual method; and the machine readable medium further comprises instructions for causing one or more processors to perform, prior to storing the code for the plurality of calling methods into the storage, the steps of:
compiling each of the plurality of calling methods to derive the code for each of the plurality of calling methods;
determining whether the current state of the target method is a first state in which the target method is not overridden by any override method; and
in response to a determination that the current state of the target method is the first state:
if in the first state the target method has been compiled into executable code, then setting the parameter of each of the plurality of calling methods to comprise a first reference to the executable code of the target method; and
if in the first state the target method has not been compiled into executable code, then setting the parameter to comprise a second reference to a set of code for invoking virtual methods.

30. The non-transitory machine readable medium of claim 18, wherein:
the target method is a virtual method; and
the machine readable medium further comprises instructions for causing one or more processors to perform, prior to storing the code for the plurality of calling methods into the storage, the steps of:
compiling each of the plurality of calling methods to derive the code for each of the plurality of calling methods;
determining whether the current state of the target method is a first state in which the target method is overridden by at least one override method; and
in response to a determination that the current state of the target method is the first state, then setting the parameter of each of the plurality of calling methods to comprise a first reference to a set of code that determines which one of the target method and the at least one override method is to be directly branched to when the instruction is executed.

31. The non-transitory machine readable medium of claim 30, wherein the set of code is in-lined code that is inserted in the code of the plurality of calling methods.

32. The non-transitory machine readable medium of claim 18, wherein the instruction is a branch-and-link processor instruction.

33. The non-transitory machine readable medium of claim 18, further comprising:
instructions for causing one or more processors to execute a virtual machine, which comprises a dynamic adaptive compiler for compiling object methods from bytecode into executable code; and the storage is a region in memory allocated to the virtual machine, wherein the region in memory is configured for storing the object methods compiled by the dynamic adaptive compiler.

34. The non-transitory machine readable medium of claim 33, wherein the virtual machine is a JAVA virtual machine.

* * * * *